United States Patent Office 3,367,864
Patented Feb. 6, 1968

3,367,864
ADDITIVES FOR LUBRICATING COMPOSITIONS
John Scotchford Elliott, Eric Descamp Edwards, and Gerald John Joseph Jayne, London, England, assignors to Castrol Limited, London, England, a British company
No Drawing. Filed Jan. 7, 1966, Ser. No. 519,008
Claims priority, application Great Britain, Jan. 8, 1965, 1,000/65
13 Claims. (Cl. 252—32.7)

This invention relates to additives for lubricating compositions and also to lubricating compositions containing the additives. In particular, the additives with which this invention is concerned are detergents which are effective cold sludge dispersants.

In the lubrication of modern internal combustion engines deposits may be formed in the engines in two ways and there are two distinct problems involved in keeping the engines clean. One problem is the deposition of soot, lacquers and other deposits, mainly in the piston ring zone, under high speed, and consequently high temperature, operating conditions. These deposits may arise from partial combustion products of the fuel or as the result of the oxidation or thermal degradation of the lubricant or both. This problem is alleviated by the addition to the lubricating oil of what are known in the art as high temperature detergents, conventional detergents or normal detergents. The other problem is the deposition of another kind of "dirt." This "dirt" has become known as "cold sludge." Cold sludge is formed in engines in cold weather and under driving conditions obtaining in cities and in other conditions when the engines never truly warm up. This latter problem is alleviated by the addition to the lubricant of additives known as cold sludge dispersants. "Cold sludge" is derived almost entirely from the fuel and is normally wet.

In the past the conventional detergents have in general been metal containing derivatives of organic compounds such as basic alkaline earth metal petroleum or alkyl benzene sulphonates, basic alkaline earth metal salts of phosphosulphurised polybutenes or alkaline earth metal phenates. The cold sludge dispersants, on the other hand, have in general been copolymers of polar monomers such as N-vinyl pyrrolidone with oil-solubilising copolymerisable monomers such as long-chain alkyl methacrylates.

More recently, products having useful detergent and cold sludge dispersant properties have been obtained by reacting a long chain monoalkenyl succinic anhydride, preferably polyisobutenyl succinic anhydride, with polyamines such as polyethylene polyamines or β-aminoethyl piperazine.

According to the present invention there is provided a novel compound, particularly suitable for use as an additive for lubricating compositions, which compound is obtainable by reacting a sultone with a reagent containing at least one long saturated or unsaturated alkyl chain linked through an ester, an amide or an imide grouping to a grouping having at least one basic nitrogen atom.

One example of a novel compound according to the invention is a sulphonic acid or a salt thereof or a sulpho betaine which is obtainable by reacting a long chain mono alkenyl succinic acid or anhydride with a di- or polyamino compound containing at least one primary amino group, the reaction product being reacted with a sultone of the general formula:

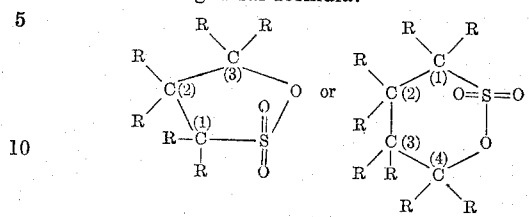

wherein each R may be a hydrogen atom, an alkyl or substituted alkyl radical, a phenyl or substituted phenyl radical, or any two of the substituents R on adjoining carbon atoms may be taken together to form a cyclic system. A preferred sultone is propane sultone.

In another form of the present invention there is provided a sulphonic acid or a salt thereof or a sulphobetaine which is the reaction product of a sultone with a long-chain saturated or unsaturated alkyl amide containing at least one basic nitrogen atom.

In yet another form of the invention the sultone is reacted with a compound having the formula $$R_1-CH-COOR_3$$
$$\phantom{R_1-}|$$
$$CH_2-CONHR_2$$

where $R_1$ is a long-chain saturated or unsaturated alkyl group, $R_2$ is the grouping $$\pm R_4-NH\pm_pH$$

and $R_3$ is H, alkyl or the grouping $$\pm R_4-O\pm_nH$$

where $R_4$ is a $C_2-C_5$ alkylene radical and $p$ and $n$ are integers from 1 to 6.

Preferably the long-chain alkyl radical is derived from a normally liquid oil-soluble polyolefin having a molecular weight of 700–3000, e.g. 750 to 1500, although in certain instances it may be possible to employ a shorter alkyl chain having not less than 12 carbon atoms. Preferably the polyolefin is polyisobutylene.

In one form of the invention the novel compound is a sulphonic acid having the general formula:

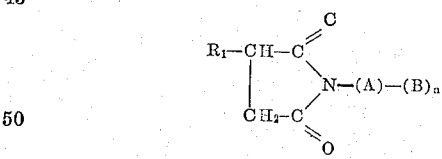

wherein $R_1$ is a monovalent α-alkenyl group, A is an organic radical containing from one to six amino groups and B is a radical of formula $\pm(CRR)_m SO_3H$ and is attached through the carbon atom to a nitrogen atom of A, where R is as previously defined, $m$ is 3 or 4 and $n$ is an integer from 1 to 6, or salt thereof. Preferably $n$ is 1. In point of fact these sulphonic acids may very well exist as inner salts or Zwitterions.

By way purely of illustration, typical novel compounds derived from long chain monoalkenyl succinic anhydrides and amino compounds of formulae (1) $$H_2N-R_4NH_2$$

and (2) 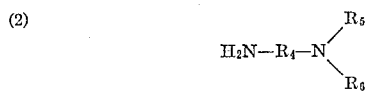

by reaction with propane sultone would have the formulae:

(1) 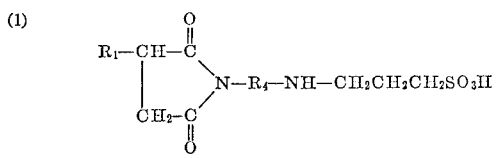

or (2) 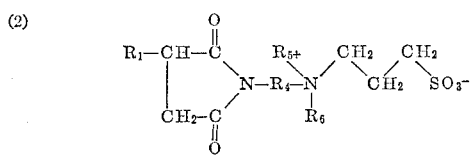

respectively, where $R_5$ and $R_6$ are alkyl radicals, and $R_1$ and $R_4$ are as previously defined.

In the case where the di- or polyamino compound contains at least two primary amino groups, the preparation of the novel compound may, at least in certain instances, be carried out by another route. Thus, the di- or polyamino compound may be first reacted with the sultone to form an amino sulphonic acid or sulphobetaine which may then be reacted with a long chain alkenyl succinic acid or anhydride.

The invention also provides a method of preparing novel compounds, particularly suitable for use as additives for lubricating compositions, which method comprises reacting a sultone with a compound containing at least one long saturated or unsaturated alkyl chain linked through an ester, an amide or an imide grouping to a grouping having at least one basic nitrogen atom. The reaction goes readily, and may be effected by mixing equimolar proportions of the reactants, optionally in a solvent, and maintaining the mixture at a temperature of from 0° C. to 200° C. The temperature is not critical, and may be chosen so that the reaction mixture has a convenient viscosity for being stirred.

A preferred method for preparing some of the novel compounds of the invention comprises heating together a long chain alkenyl succinic acid or anhydride with a di- or polyamino compound containing at least one primary amino group with elimination of water and subsequently reacting the product thus formed with a sultone as hereinbefore defined to form a compound which contains a sulphonic acid or sulphobetaine grouping.

An alternative method of preparing these novel compounds comprises reacting together a mixture of a suitable di- or polyamino compound and a sultone as herein described to yield a product containing at least one primary amino group. The reaction product is subsequently heated with an acidic reagent containing at least one long saturated or unsaturated alkyl chain, for example, a long chain alkenyl succinic acid or anhydride, with elimination of water.

The long chain monoalkenyl succinic acid or anhydride may be obtained from the reaction between a normally liquid oil soluble polyolefin having a molecular weight of from 700 to 3000, preferably from 750 to 1500, and maleic anhydride. Preferably the polyolefin is polyisobutylene.

Suitable di- or polyamino compounds for use in the present invention are alkylene polyamines having the general formula:

$$H_2N(R_7NH)_xH$$

wherein $x$ is an integer and $R_7$ is a divalent alkylene radical. Examples of such amines are ethylene diamine, diethylene triamine, triethylene tetramine, tetraethylene pentamine, pentaethylene hexamine and mixed higher polyethylene polyamines. Other alkylene polyamines such as di(1,2-propylene) triamine, or N-(2-amino ethyl) trimethylene diamine may be employed, if desired. Such alkylene polyamines may be first reacted with a γ-lactone, preferably γ-butyro lactone, as described in our co-pending British application No. 36,965/63 published as British patent specification No. 1,054,370 or with dicyandiamide as described in our co-pending United States application No. 470,564 (now Patent No. 3,338,831, Aug. 29, 1967) provided that such reaction products contain at least one primary amino group.

Usefully higher polyamines have moleculer weights from 300 to 1000 or 5,000, preferably 400 to 600, especially those prepared by polymerising ethylene imine. The process of polymerising ethylene imine gives rise to mixtures of polyethylene polyamines having a wide range of molecular weights. These may be divided into mixtures having narrow ranges of molecular weights, those indicated being the most useful in this invention.

Another polyamine which is useful in this invention is one marketed by Union Carbide Limited under the name of "Polyamine D" (PAD) which is stated to be predominantly a mixture of isomeric penethylene hexamines of formula $C_{10}H_{28}N_6$ and related hexamines containing piperazine rings and 12 C atoms. The average molecular weight of the mixture is approximately that of pentaethylene hexamine, i.e. 233, and the mixture contains a predominance of amines having 2–4 primary amino groups and at least two secondary amino groups.

Other suitable diamino compounds which may be employed are N-dialkylamino alkylamines of the general formula:

wherein $R_4$ is a divalent alkylene radical and $R_5$ and $R_6$ are alkyl radicals. Examples of such N-dialkylamino alkylamines include dimethylaminoethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine and propylbutylaminoethylamine.

Further suitable diamino compounds are N-(β-aminoalkyl) piperazines of formula:

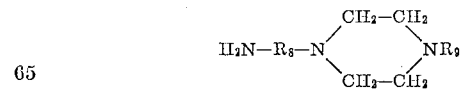

wherein $R_8$ is an alkenyl radical containing 1 to 3 carbon atoms and $R_9$ is a hydrogen atom or a hydrocarbon radical containing from 1 to 3 carbon atoms.

Aromatic di- or polyamines may also be used in the invention such as, for example, p-phenylene diamines, o-phenylene diamine, benzidine and substituted derivatives thereof.

Other miscellaneous di- or polyamino compounds which may be used in the invention are N-(2-aminoethyl)ethanolamine and hydroxy tetraethylene tetramine.

Further examples of suitable nitrogen bearing intermediates which may be reacted with sultones in accordance with the present invention are those prepared by reacting a polyisobutenyl succinic anhydride with a polyalkylene polyamine and reacting the product with a carboxylic acid to form an imidazolinyl substituted succinimide.

Alternatively, the product obtained by reacting polyisobutenyl succinic anhydride and a polyalkylenepolyamine may be reacted with an aldehyde or with a ketone, to form an imine prior to reaction with a sultone.

Specific examples of sultones which may be used in the present invention include the following, the nomenclature being as indicated in the general formulae:

Propane sultone
2,2-dimethyl propane sultone
1,4-butane sultone
3-methyl propane sultone
3,3-dimethyl propane sultone
1,1,3-trimethyl propane sultone
2,2,3,3-tetramethyl propane sultone
1,2,3,3-tetramethyl propane sultone
1,2,2,3,3-pentamethyl propane sultone
2,3,3-trimethyl-2-phenyl propane sultone
2,2,4,4-tetramethyl butane sultone
Hydroxy propane sultone
"Octadecane" sultone Examples of sultones in which in the above general formula two radicals R are taken together to form a cyclic system, are those having the structures

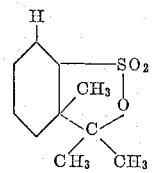

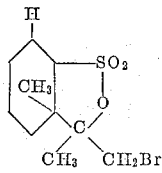

or naphtho-1,8 sultone.

For further details, reference is made to J.A.C.S., 86, p. 4641, Nov. 5, 1964, where an article by Ohline, Allred and Bordwell is entitled "Structures of Sultones From Proton Magnetic Resonance."

Whilst it is generally preferred to employ long-chain alkenyl succinimides of the type described as the intermediates for reaction with sultones in accordance with the present invention, it is to be understood that other long-chain intermediates may be employed instead. Thus, for example, halogenated polyisobutylenes may be condensed with $C_3$-$C_8$ $\alpha,\beta$ unsaturated acids to form monocarboxylic acids which are then further condensed with di- or polyamino compounds as described above.

Alternatively, polyisobutenyl succinic anhydride may be reacted with a di- or polyamino compound at a sufficiently low temperature to form an amic acid instead of succinimide. This is then further reacted with a sultone.

Alternatively polyisobutenyl succinic anhydride may be reacted first with a hydroxy compound to give a half ester and subsequently with a di- or polyamino compound as defined above to give an ester amide which is then further reacted with a sultone.

Whilst the additives of the present invention are valuable ashless dispersants it may be desirable, in certain circumstances, particularly for use in diesel engines, to include a minor proportion, for example, up to 10% by weight of an alkaline earth metal base, e.g. calcium carbonate. This may be incorporated by any of the well-known methods, as illustrated in the examples which follow.

Suitable basic compounds which may be reacted with the novel sulphonic acids of the present invention are the alkaline earth metal oxides or hydroxides.

This invention also includes a lubricating composition comprising a major proportion of a lubricating oil and a minor proportion, sufficient at least to impart detergency or dispersancy to the oil of the said novel compound.

The lubricating compositions of this invention may exhibit adequate cold sludge dispersancy and high temperature detergency by the incorporation therein of quite small amounts of the additive, and the compositions may contain, preferably, from 0.5% to 5.0% by weight of the additive on the weight of the composition. However, in some cases, particularly in the case when a lubricating oil concentrate is required, it may be desirable to use amounts greater than 10%.

It is to be understood that the lubricating compositions of the present invention may contain also copper deactivators, pour-point depressants, antioxidants, viscosity index improvers and other conventional additives as necessary.

Particularly preferred antioxidants which may be used in conjunction with the additives of the present invention are the metal salts of dialkyl or di(alkaryl) dithiophosphates, especially the zinc salts of dialkyl dithiophosphoric acids derived from $C_4$-$C_{10}$ alcohols. The dithiophosphate may be present in the composition in amounts from 0.2 to 2% and preferably from 0.5 to 1.5% by weight based on the weight of the composition.

Following is a description by way of example of a method of preparing typical additives and of lubricating compositions in accordance with the present invention.

EXAMPLE I

*The preparation of polyisobutenyl succinic anhydride*

(1) 330 g. (0.3 mole) of a polyisobutylene of average molecular weight 1100, 32.34 g. (0.33 mole) of maleic anhydride and 5.82 g. (0.04 mole) of di-t-butyl peroxide were refluxed with stirring in 210 mls. of toluene, in a 2-litre flask fitted with thermometer pocket, nitrogen inlet, condenser and rotational stirrer, for 30 hours. The toluene was distilled off and 210 mls. of hexane added, whereupon unreacted maleic anhydride was precipitated and this was removed by filtration using a filter aid. The hexane was distilled off and the product vacuum stripped for 1 hour at 200° C. and 10 mm. Hg pressure. The product was again filtered through a steam-heated filter funnel to yield 296 g. of a clear brown product. The purity of the product was determined by saponification. The saponification value was 73.5 mg. KOH/g. (calculated=93.5). The product therefore contained about 79% of polyisobutenyl succinic anhydride together with 21% of unreacted hydrocarbon.

(2) A similar product was obtained by stirring 475 gm. of polyisobutylene (M.W. 950) with 54 gm. maleic anhydride at 240° C. for 30 hours. The reactants were allowed to cool, 300 mls. of hexane added and the solution filtered through a diatomaceous filter aid. The hexane was distilled off and the product vacuum stripped for 2 hours at 200° C. and 10 mm. Hg pressure. 361 gm. of clear viscous liquid was obtained.

The saponification value of the product was 83.8. This product therefore also contained 79% of polyisobutenyl succinic anhydride.

This alternative method of preparation has been described in Belgian Patent No. 619,375.

*Reaction between polyisobutenyl succinic anhydride and tetraethylene pentamine*

433.5 g. (0.3 mole assuming 79.5% purity) of polyisobutenyl succinic anhydride prepared by method (2) above and 56.7 g. (0.3 m.) of tetraethylene pentamine were heated in a nitrogen atmosphere for 4 hours at 200–220° C. during which time water was evolved. After vacuum stripping for 1½ hours the product was found to contain 3.78% nitrogen.

*Preparation of the propane sulphonic acid of the reaction product thus obtained*

104 g. (0.065 mole) of the reaction product thus obtained, 104 g. of light mineral oil and 7.93 g. (0.065 mole) of propane sultone were stirred together at 100° C. on an oil bath for 3 hours, the temperature being raised subsequently to 220° C. and the reaction continued for a further two hours. The product was vacuum stripped at 220° C. under 5–20 mm. Hg pressure for 2 hours. 187 g. of a product containing 1.75% nitrogen and 1.47% sulphur was obtained.

EXAMPLE II

*Reaction of product of Example I with barium hydroxide*

To 167 g. (0.05 mole) of a product prepared as in Example I, contained in a beaker fitted with a stirrer, was added a solution of 7.56 g. (0.024 mole) of $$Ba(OH)_2.8H_2O$$

in the minimum amount of water. The mixture was emulsified by vigorous stirring and while continuing the stirring the temperature was slowly raised to 150° C. with nitrogen blowing. When substantially all the water was removed the product was analysed and found to contain 2.15% Ba, 2.28% N and 1.55% S.

EXAMPLE III

*Reaction of product of Example I with excess barium hydroxide*

The reaction was repeated as in Example II with the exception that the quantities of reactants used were 165 g. (0.05 mole) of a product prepared as in Example I and 15.75 g. (0.05 mole) of $Ba(OH)_2.8H_2O$. After the removal of water, the product was filtered through a steam-heated funnel under vacuum. The product thus obtained contained 3.66% Ba, 1.19% N and 1.19% S.

EXAMPLES IV to XXVII

Analogous reactions were carried out using other di- or polyamino compounds, essentially the same reaction conditions being employed, except that the propane sultone was added dropwise.

The polyisobutenyl succinic anhydride used was derived from the same polyisobutylene as in Example I and the molar ratios of the reactants were as indicated in Table I. The sulphonic acids prepared (as 50% concentrates in mineral oil) and their analyses are listed in Table I whilst in Table II details are given of certain imidazolines, imines and a formamide prepared from an intermediate succinimide similar to that of Example I, but in a neat form, these being prepared by reaction with the compounds listed under the conditions described. The solvent used in general was toluene, which was removed prior to reaction with propane sultone.

TABLE I

| Ex. No. | Di or Polyamino Compound | | Polyisobutenyl Succinic Anhydride | | Intermediate Succinimide | | | Propane Sultone | | Analysis of Sulphonic Acid Product, percent | |
|---|---|---|---|---|---|---|---|---|---|---|---|
| | Compound | Wt. (g.) Moles | Wt. (g.) | Moles | Percent N | Wt. (g.) | Moles | Wt. (g.) | Moles | N | S |
| IV | The product obtained by reacting 232 g. (1.0 mole) of penta ethylene hexamine and 84 g. (1.0 mole) of dicyandiamide at 280° C. for 8 hours. | 149.5  0.5 | 685 | 0.5 | (¹) | 1,584 | 0.5 | 61.0 | 0.5 | 2.59 | 1.85 |
| V | Polyamine D | 116  0.5 | 685 | 0.5 | (¹) | 1,584 | 0.5 | 61.0 | 0.5 | 2.02 | 1.77 |
| VI | Penta ethylene hexamine | 116  0.5 | 850 | 0.5 | 2.07 | 1,200 | 0.313 | 38.1 | 0.313 | 1.94 | 1.28 |
| VII | Tri ethylene tetramine | 73  0.5 | 680 | 0.5 | 1.58 | 298 | 0.1 | 12.2 | 0.1 | 1.48 | 1.28 |
| VIII ² | Di ethylene triamine | 41.2  0.4 | 170 | 0.1 | 1.16 | 178.5 | 0.05 | 6.1 | 0.05 | 1.11 | 1.18 |
| IX ² | Ethylene Diamine | 24.0  0.4 | 170 | 0.1 | 0.94 | 174 | 0.05 | 6.1 | 0.05 | 0.69 | 1.26 |
| X | Polyethylene imine (M.W. 1,000–5,000) (50% in water). | 75.6 ³0.2 | 274 | 0.2 | 1.94 | 154 | 0.05 | 6.1 | 0.05 | 1.81 | 2.06 |
| XI | Polyethylene imine (33% imine + 67% water) (M.W. 4,000 to 60,000) (after reaction an equal volume of benzene was added to facilitate filtration which was afterwards stripped out). | 113.4 ³0.2 | 274 | 0.2 | 1.64 | 154 | 0.05 | 6.1 | 0.05 | 1.59 | 1.8 |
| XII | In this example the Intermediate was a commercially available succinimide believed to be derived from a similar polyisobutylene succinic anhydride and a mixture of polyethylene polyamines. | | | | 2.28 | 1,200 | 0.4 | 48.8 | 0.4 | 2.25 | 0.97 |
| XIII | N-β amino ethylpiperazine | 12.9  0.1 | 170 | 0.1 | 1.18 | 181 | 0.05 | 6.1 | 0.05 | 1.10 | |
| XIV | N,N'dimethylamino ethyl propylamine. | 11.9  0.117 | 168.5 | 0.117 | 0.92 | 152.4 | 0.05 | 6.1 | 0.05 | 0.76 | 1.42 |
| XV | N-(2-aminoethyl morpholine) | 13.0  0.1 | 170 | 0.1 | 0.78 | 181 | 0.05 | 6.1 | 0.05 | 0.79 | 1.20 |
| XVI ⁴ | p.Phenylene diamine | 10.8  0.1 | 170 | 0.1 | 0.69 | 179 | 0.05 | 6.1 | 0.05 | 0.68 | 1.27 |
| XVII | N-(2-aminoethyl ethanolamine) | 10.4  0.1 | 170 | 0.1 | 0.67 | 179 | 0.05 | 6.1 | 0.05 | 0.65 | 1.33 |
| XVIII | Hydroxy Tetraethylene tetramine. | 19.1  0.1 | 137 | 0.1 | 1.56 | 154.3 | 0.05 | 6.1 | 0.05 | 1.55 | 1.81 |
| XIX | The product obtained by reacting 258 g. (3.0 moles) of α-butyrolactone at 200° C. with 567 g. (3.0 moles) of tetraethylene pentamine for 16 hours. | 128.5  0.5 | 645 | 0.5 | 1.50 | 153 | 0.05 | 6.1 | 0.05 | 1.39 | 1.54 |
| XX | Guanidine carbonate (in this case the polyamino compound and the anhydride were refluxed in 120 mls. of toluene for 12 hours. until 3.4 ml. of water evolved. The toluene was removed by distillation prior to reaction with propane sultone). | 17.8  0.1 | 306 | 0.2 | 1.24 | 161 | 0.05 | 6.1 | 0.05 | 1.16 | 1.83 |

Note: All the products were approximately 50% concentrates in mineral oil. The high sulphur contents of the products were due to the fact that the mineral oil used contained an appreciable amount of sulphur.
¹ Not isolated.
² Excess amine stripped from product.
³ As tetraethylene pentamine.
⁴ 85 ml. toluene as solvent.

TABLE II

| Ex. No. | Intermediate Succinimide of Example 1 | | Modifying Compound | | | Vol. of Solvent (ml.) | Conditions of Reaction | Intermediate Analysis Percent N | Wt. (g.) | Moles | Propane Sultone, Wt. (g.) | Analysis of Sulphonic Acid Product, percent | |
|---|---|---|---|---|---|---|---|---|---|---|---|---|---|
| | Wt. (g.) | Moles | Name | Wt. (g.) | Moles | | | | | | | N | S |
| XXI | 770 | 0.5 | Acetic acid | 30 | 0.5 | 3,000 | Solution refluxed until no water evolved, cooled to 70° C., HOAC added, maintained at 70° C. for 3 hrs. 10 mls. H₂O evolved. 776 g. mineral oil added after stripping. | 1.85 | 1,165 | 0.375 | 45.7 | 1.74 | 1.78 |
| XXII | 308.2 | 0.2 | Lauric acid | 40 | 0.2 | 1,000 | Refluxed for 24 hrs., 3–4 mls. H₂O evolved; 344 g. mineral oil added after stripping. | 1.85 | 344.6 | 0.1 | 12.2 | 1.69 | 1.74 |
| XXIII | 125 | 0.06 | Oleic acid | 22.7 | 0.06 | 1,000 | As above; 1.5 mls. H₂O evolved, 146 g. mineral oil added. | 1.75 | 120 | 0.032 | 4.06 | 1.74 | 1.66 |
| XXIV | 308.2 | 0.2 | Adipic acid | 7.3 | 0.1 | 1,000 | As above; 313 g. mineral oil added. | 1.48 | 313 | 0.1 | 12.2 | 1.46 | 1.94 |
| XXV | 91 | 0.05 | Salicylaldehyde | 6.1 | 0.05 | 350 | Refluxed until 0.5 ml. H₂O evolved, 96 g. mineral oil added. | 1.42 | 96 | 0.025 | 3.05 | 1.28 | 1.19 |
| XXVI | 91 | 0.05 | Benzaldehyde | 5.3 | 0.05 | 350 | As above—diluted to 50% with mineral oil. | 1.29 | 95 | 0.025 | 3.05 | 1.29 | 1.30 |
| XXVII | 145.5 | 0.025 | Formic acid | 3.9 | 0.075 | ² 300 | | (³) | (³) | (³) | 3.05 | 1.62 | 1.23 |

¹ Neat.  ² Xylene.  ³ Not isolated.

NOTE: In all cases the propane sultone and intermediate were employed in equimolar amounts. In Example XXVII, the intermediate of Example 1 was used as a 50% oil concentrate instead of neat, no oil being subsequently added.

EXAMPLES XXVIII–XXXIII

These compounds were prepared in a substantially identical manner to those in Table I except that the molecular weight of the polyisobutylene was varied. The analysis of the intermediates and sulphonic acid products are given in Table III.

TABLE III

| Example No. | Di or Poly amino compound | Polyisobutylene, Molecular Weight | Intermediate Analysis Product, Percent | | |
|---|---|---|---|---|---|
| | | | N | N | S |
| XXVIII | Triethylene tetramine | 1,400 | ---- | 0.82 | 1.55 |
| XXIX | ...do... | 1,900 | ---- | 0.74 | 1.39 |
| XXX | Tetraethylene pentamine | 1,400 | 1.55 | 1.44 | 1.23 |
| XXXI | Pentaethylene hexamine | 1,400 | 1.79 | 1.61 | 1.21 |
| XXXII | Polyamine "D" | 1,400 | 1.71 | 1.70 | 1.53 |
| XXXIII | N-β-aminoethyl piperamine | 1,400 | 0.91 | 1.01 | 1.61 |

EXAMPLE XXXIV 187 g. (0.05 mole) of an intermediate, derived from tetraethylene pentamine and a polyisobutenyl succinic anhydride prepared in a manner substantially identical to that in Example I, containing 1.61% N, were stirred with 8.2 g. (0.05 mole) of 1,1,3-trimethyl propane sultone under nitrogen for 4 hours at 100° C. The product contained 1.54% N and 1.60% S and the infra-red spectograph thereof showed the presence of imide and sulphonic acid or sulphonate groupings.

EXAMPLE XXXV

The next two examples demonstrate the alternative method of preparing the novel additives of the present invention.

*Preparation of tetraethylene pentamino propane sulphonic acid*

37.8 g. (0.2 mole) of tetraethylene pentamine were dissolved in 200 ml. of methanol and 24.4 g. (0.2 mole) of propane sultone were added, when a slight exotherm was noted. The mixture was stirred for 2 hours at room temperature under nitrogen after which time the methanol was removed under vacuum, whereupon 61 g. of a clear yellow semi-solid was obtained, which contained 9.1% sulphur (10.3% calculated) and 19.7% nitrogen (22.6% calculated). Infra-red analysis showed the presence of sulphonic acid or sulphonate groups.

*Preparation of an additive according to the present invention*

31.1 g. (0.1 mole) of tetraethylene pentamino propane sulphonic acid as prepared above and 137 g. (0.1 mole, assuming 84% purity) of a polyisobutenyl succinic anhydride (M.W. ca. 1150) were heated with stirring at 200° C. for 4 hours under nitrogen. The mixture was diluted with 168 g. of mineral oil and filtered through a steam heated funnel to yield 230 g. of a product containing 1.36% nitrogen and 1.32% sulphur. Infra-red analysis gave a trace substantially the same as that given by the product of Example I.

EXAMPLE XXXVI

*Preparation of Polyamine "D" trimethyl propane sulphonic acid*

The preparation was substantially the same as in Example XXXV except that 23.2 g. (0.1 mole) of Polyamine "D" and 16.4 g. (0.1 mole) of 1,1,3 trimethyl propane sultone were used and the reaction was slightly endothermic. The product contained 18.9% nitrogen (21.2% calculated) and 7.32% sulphur (8.08% calculated). The infra-red analysis showed that the product was a polyethylene polyamine sulphonic acid.

*Preparation of an additive according to the present invention*

19.8 g. of (0.05 mole) of the product thus obtained and 68.5 g. (0.05 mole, assuming 84% purity) of the polyisobutenyl succinic anhydride used in Example XXXV were stirred at 200° C. for 4 hours. The product, after dilution with 87.4 g. of mineral oil and filtration, contained 1.52% nitrogen and 1.41% sulphur and infra-red analysis gave a substantially similar trace to those given by the compounds of previous examples.

EXAMPLE XXXVII

To a stirred mixture of 340 g. of polyisobutenyl succinic anhydride (0.2 mole assuming 67.5% purity) and 200 mls. of benzene, were added at ambient temperature dropwise over 15 minutes 29.2 g. (0.2 mole) of triethylene tetramine under nitrogen. The temperature was raised to 60° C. and maintained there for 6 hours, after which time the benzene was removed under vacuum and the residue diluted to 50% with mineral oil. The product contained 1.61% nitrogen and infra-red analysis showed it to be mainly amic acid with a minor amount of imide present.

To 183 g. (0.05 mole) of the product thus obtained at 60° C. was added dropwise, with stirring, 6.1 g. (0.05 mole) of propane sultone. The mixture was maintained at this temperature for 5 hours, after which time the reaction was substantially complete and the product was found to contain 1.49% nitrogen and 1.18% sulphur. Infra-red analysis showed the presence of amide, carboxylate and sulphonic acid groupings and a minor amount of imide in the product.

EXAMPLE XXXVIII

In this example the intermediate used was a commercially available oil solution of a polyalkylene polyamine amide of a polyisobutenyl mono-carboxylic acid containing 1.05% nitrogen. 6.1 g. (0.05 mole) of propane sultone were added dropwise to 150 g. of this product maintained at 100° C. with stirring under nitrogen. This temperature was maintained for three hours, after which time the product was found to contain 1.04% nitrogen and 0.93% sulfur. Infra-red analysis showed that the expected product containing sulphonic acid or sulphonate groups was obtained.

EXAMPLE XXXIX

A mixture of 160.2 g. (0.05 mole) of a compound substantially the same as that prepared in Example I, 2.8 g. (0.05 mole) of calcium oxide and 40 ml. of petroleum ether (boiling range 60–80° C.) was heated to 60° C. and 16.0 g. (0.5 mole) of methanol was added dropwise. After 30 minutes the mixture was refluxed for a further hour. The mixture was cooled to below 30° C. and 8.8 g. of carbon dioxide slowly bubbled through. After filtration through a heated funnel the solvents were removed under vacuum and the product was found to contain 1.07% calcium (1.2% calculated) 1.76% nitrogent and 1.14% sulphur. The starting material contained 1.88% nitrogen and 1.38% sulphur.

In order to obtain some information on the dispersancy of the additives of the present invention at relatively high temperatures, such as those encountered in the piston ring-belt area of diesel engines, lubricating compositions containing them were subjected to "Panel Coker Tests."

In this test the oil sample (250 ml. approx.) was contained in a sump which was fed by a chicken feed to maintain a constant level of oil. The oil was splashed continuously for 24 hours by means of wires on a rotating spindle on to a heated sloping aluminium panel maintained at 275° C.

The weight change and appearance of the panels were observed after test, the appearance of the panels being assigned ratings which were determined by comparing with a set of 28 panels divided into four groups. Where the panels were merely stained these panels were given numbers 1–7 in increasing order of staining, i.e. number 1 was practically clean and number 7 was black. In the second group the same numbers were assigned 1–7 but the suffix "L" was placed after the number to indicate that it had the same staining but was lacquered. Similarly in Group 3 the suffix "B" showed the appearance of bubbles on the same background. In Group 4, the suffix "S" showed that the panel was sooted, the number referring to the panel colour. A rating of 4 or less was considered to be reasonable.

The results of these tests are given in Table IV, from which it will be seen that the additives of the present invention were effective dispersants under high temperature conditions and gave results as good as or better than the basic barium petroleum sulphonate which was a widely used metallic detergent. It has been found by experience that this test, gives results which correlate well with tests in the Petter AV.1 engine when operated under the standard AT–4 conditions.

TABLE IV.—RESULTS OF PANEL COKER TESTS

| Example No. | Product of Example No. | Percent Additive | ZDDP | Percent ZDDP | Rating | Wt. gain (mg.) |
|---|---|---|---|---|---|---|
| Base Oil | | | | | 6L | 165 |
| Basic barium petroleum sulphonate. | | 3.7 | 2 | 0.9 | 3 | 28.8 |
| XL | I | 2 | 1 | 0.7 | 3 | 37.9 |
| XLI | II | 2 | 1 | 0.7 | 3 | 22.1 |
| XLII | III | 2 | 1 | 0.7 | 4 | 27.8 |
| XLIII | IV | 2 | 2 | 0.9 | 3 | 45 |
| XLIV | V | 2 | 2 | 0.9 | 3 | 24.6 |
| XLV | VI | 2 | 2 | 0.9 | 3 | 47.3 |
| XLVI | X | 2 | 2 | 0.9 | 3 | 26.6 |
| XLVII | XII | 2 | 2 | 0.9 | 4 | 34.8 |
| XLVIII | XXI | 2 | 2 | 0.9 | 4 | 8.5 |
| XLIX | XXVIII | 2 | 2 | 0.9 | 3 | 23.0 |
| L | XXX | 2 | 2 | 0.9 | 4 | 59.8 |
| LI | XXXI | 2 | 2 | 0.9 | 4 | 30.3 |
| LII | XXXII | 2 | 2 | 0.9 | 4 | 11.8 |
| LIII | XXXIV | 2 | 2 | 0.9 | 4 | 33.4 |
| LIV | XXXVI | 2 | 2 | 0.9 | 4 | 25.0 |
| LV | XXXVII | 2 | 2 | 0.9 | 4 | 67.2 |

The base oil used throughout in these Panel Coker tests was a solvent refined mineral oil having a viscosity of about 160 seconds Redwood at 140° F. and all the blends tested contained a mineral oil concentrate of mixed zinc dialkyl dithiophosphates (ZDDP). Two different ZDDP's were employed, ZDDP-1 being derived from isopropanol and methyl isobutyl carbinol whereas ZDDP-2 was derived from isopropanol and capryl (1-methyl heptyl) alcohol. Both concentrates contained about 8.0% of phosphorus.

A series of tests was carried out to illustrate the cold sludge dispersant properties in lubricants of the additives of the present invention. A simple laboratory test, designed to obtain information regarding the "cold sludge" dispersant properties of lubricants and additives, was performed in the following manner:

A quantity of "cold sludge" was collected from a Lauson engine which had been run deliberately under low temperature conditions using a leaded petrol and, as the lubricant, a plain mineral oil free from additives. This sludge was an emulsion containing from about 10% to about 50% of water, the remainder containing from 0.8-4.0% of lead, from 3-10% of material insoluble in pentane and from 1-10% of material insoluble in benzene, all percentages being by weight. The sludge (1 gram) was shaken for 30 minutes with 20 mls. of a light spindle oil having dissolved therein the additive under test on an automatic shaking machine and then poured into a measuring cylinder with a tapered base which was allowed to stand in an oven at 60° C.

The cylinder was removed from the oven periodically and examined for signs of separation of the sludge. Changes in the colour of the oil proved to be the most reliable indication of sludge separation, the colour changing from black or grey (depending on the sample of sludge used) through brown and speckled (in that order) to that of the clear oil. When the sludge was completely dispersed, the oil was black, blue or grey.

Solutions in mineral oil were prepared using the products listed in Table IV. The solutions were prepared in such a manner that there was present 2.5% of the neat additive according to the present invention and these gave results comparable to those given by prior art cold sludge dispersants in that the solutions were still black or grey after 4 weeks and in most cases after 7 or 8 weeks.

Certain other of the examples were found to have good detergency as measured by the Panel Coker test but were less effective as cold sludge dispersants. In general the best cold sludge dispersants were those derived from polyisobutylenes having N.M.'s of 1400 or more or those derived from polyamines having 5 or more nitrogen atoms.

In order to evaluate the high temperature oxidation stability of lubricating oils containing additives in accordance with the present invention, tests were carried out in "Petter" (registered trademark) W-1 engines operating under the following conditions:

| | |
|---|---|
| Test duration | 36 hours. |
| Speed | 1500±15 r.p.m. |
| B.H.P. | about 3.3. |
| Sump temperature | 280° F. |
| Coolant outlet temperature | 302±2° F. |
| Coolant inlet temperature | 299±2° F. |
| Fuel | PE/IP reference gasoline. |

The conditions for the Petter W-1 Test are set forth in the Institute of Petroleum Test IP 176/60T.

In this test the maximum rating for each of the components A, B and C was 10.0. The general cleanliness of the piston, indicated in the composite rating $A+B+C$, together with the degree of oxidation of the oil, as adjudged by the corrosion, if any, of the copper-lead bearings, gave a measure of the oxidation resistance of the oil.

The results of these tests are given in Table V, the base oil used throughout these tests being Mineral Oil A, the same oil as used for the Panel Coker tests.

A further series of extended Petter W-1 tests (108 hours duration) were carried out on fully formulated lubricating oils, the results being given in Table VI. All the blends in this table were SAE 10W/30 oils made up as follows:

| | Percent |
|---|---|
| Mineral Oil B | 28.6 |
| Mineral Oil C | 56.9 |
| Methacrylate V.I. Improver (15% in Mineral Oil B) | 8.0 |
| Additive A | 3.7 |
| ZDDP-2 | 0.9 |
| Ashless Dispersant | 1.9 |

Mineral Oil B was a pale spindle oil having a viscosity of about 52 seconds Redwood I at 140° F.

Mineral Oil C was a solvent refined mineral oil having a viscosity of about 100 seconds Redwood No. 1 at 140° F.

Additive A was the barium salt of a phosphosulphurized polyisobutylene of molecular weight about 1000, the neutralisation having been effected in the presence of an alkyl phenol, followed by treatment with carbon dioxide.

Various compounds in accordance with the present invention were used as the ashless dispersant, comparative data also being provided on a commercially available polyisobutenyl succinimide type dispersant of the prior art ("Ashless Dispersant X"). This was in fact the intermediate used in the preparation of Example XII (see Table I).

The results in Table V showed that the additives of the present invention acted as effective dispersants under the test conditions employed. The rather high bearing losses were probably due to insufficient antioxidant having been used.

This was borne out by the results obtained on Example LXI, LXIV in Table VI.

In Table VI, the additives of the present invention were at least as effective dispersants as the commercially available dispersant and showed improved bearing corrosion characteristics.

In order to evaluate the detergent properties of typical additives in accordance with the present invention at high temperatures, tests were carried out in a Petter (registered trademark) AV-1 engine, operating under the following conditions (AT-4 conditions),

| | |
|---|---|
| Test duration | 120 hours. |
| Speed | 1500 r.p.m. |
| B.H.P. | 5.0. |
| Engine cooled with kerosine: | |
| Sump temperature | 131°±4° F. |
| Coolant outlet temperature | 185° F. |
| Coolant inlet temperature | 173°±3° F. |
| Fuel | 0.4% sulphur. |

The AT-4 conditions are specified in the Institute of Petroleum Standards for Petroleum and its Products: Method IP/175/60T. The results of these tests are given in Table VII, merit ratings have been employed in the same manner as for the Petter W-1 tests instead of the demerit ratings specified in the standard method.

A further series of Petter AV-1 tests were carried out on fully formulated SAE 10W/30 motor oils using the so-called HR-1A procedure employing fuel containing 1% sulphur, the results being given in Table VIII. The blends in this table had the same general composition as those in Table VI, only the ashless dispersant being varied. Results on certain commercially available multigrade motor oils are included for comparison.

The results of the Petter AV-1 tests in Table VIII, in which the composite merit rating $A+B+C$ was the most important criterion, showed clearly that the high temperature dispersancy of typical additives of the present invention, when employed in fully formulated motor oil compositions, was outstandingly good, being definitely superior to the prior art ashless dispersant. The four lubricating oil compositions of the present invention also showed very definite superiority over the two commercially available multigrade motor oils.

In the simple compositions detailed in Table VII the superiority of the additives of the present invention over the prior art additives was less marked but both compositions gave very adequate results.

TABLE V.—RESULTS OF PETTER W-1 ENGINE TESTS

| Example No. | Additives | Skirt Rating A | Land Rating B | Groove Rating C | A+B+C | Bearing loss (mg.) |
|---|---|---|---|---|---|---|
| | None (average of 21 tests) | 7.4 | 1.5 | 1.8 | 10.7 | 1,151 |
| | 0.7% ZDDP-1 | 6.8 | 1.0 | 1.0 | 8.8 | 5 |
| | 0.7% ZDDP-2 | 8.6 | 2.9 | 4.7 | 16.2 | 6 |
| | 0.9% ZDDP-1<br>3.7% Basic barium petroleum sulphonate | 10.0 | 8.4 | 8.9 | 27.3 | 5 |
| | 0.7% ZDDP-1<br>1.6% Additive A | 9.7 | 8.5 | 7.6 | 25.8 | 8 |
| LVI | 0.7% ZDDP-2<br>2.0% Example IV | 9.4 | 5.5 | 7.2 | 22.1 | 19 |
| LVII | 0.7% ZDDP-2<br>2.0% Example V | 8.8 | 6.5 | 6.8 | 22.1 | 26 |
| LVIII | 0.7% ZDDP-2<br>2.0% Example I<br>0.5% Basic calcium sulphonate | 10.0 | 7.8 | 9.3 | 27.1 | 27 |
| LIX | 1.0% Ethyl 728<br>2.0% Example I | 9.0 | 6.8 | 6.7 | 22.5 | 25 |

The basic calcium sulphonate used in Example LVIII had a base Number of 300.
Ethyl 728 was a commercially available hindered phenol antioxidant.

TABLE VI.—EXTENDED PETTER W-1 TESTS (FULLY FORMULATED MOTOR OILS)

| Example No. | Ashless Dispersant (used at 1.9% concentration) | Hours Run | Skirt Rating A | Land Rating B | Groove Rating C | A+B+C | Bearing loss (mg.) |
|---|---|---|---|---|---|---|---|
| | Ashless Dispersant X | 36 | 10.0 | 5.5 | | | 12 |
| | | 72 | 8.9 | 4.5 | | | 213 |
| | | 108 | 9.1 | 2.4 | 5.3 | 16.8 | 544 |
| LX | Example XII | 36 | 10.0 | 8.5 | | | 8 |
| | | 72 | 10.0 | 7.0 | | | 18 |
| | | 108 | 10.0 | 5.8 | 7.2 | 23.0 | 31 |
| LXI | Example XXX | 36 | 9.5 | 7.0 | | | 5 |
| | | 72 | 9.4 | 6.0 | | | 20 |
| | | 108 | 9.8 | 4.0 | 2.7 | 15.5 | 266 |
| LXIV | Example XXX+0.5% Ethyl 728 | 36 | 10.0 | 7.0 | | | 9 |
| | | 72 | 9.9 | 6.5 | 5.0 | 21.0 | 30 |
| | | 108 | 10.0 | 6.0 | | | 53 |
| LXII | Example XXI | 36 | 9.5 | 6.0 | | | 5 |
| | | 72 | 9.5 | 5.0 | | | 9 |
| | | 108 | 9.1 | 3.6 | 4.3 | 17.0 | 96 |

TABLE VII.—PETTER AV-1 ENGINE TESTS AT/4 PROCEDURE—0.4% SULPHUR FUEL

| Example No. | Additives | Average ring groove lacquer A | Average land lacquer B | Skirt lacquer C | A+B+C | Underside lacquer |
|---|---|---|---|---|---|---|
| | 1.55% Additive A<br>0.7% ZDDP-2 | 6.4 | 5.1 | 9.8 | 21.3 | 7.6 |
| | 2.0% Ashless Dispersant Y<br>0.7% ZDDP-2 | 4.4 | 6.2 | 9.6 | 20.2 | 4.7 |
| LVI | 2.0% Example IV<br>0.7% ZDDP-2 | 4.9 | 5.7 | 9.7 | 20.3 | 6.7 |
| LVIII | 2.0% Example I<br>0.7% ZDDP-2<br>0.5% Basic calcium sulphonate | 5.9 | 6.3 | 9.9 | 22.1 | 7.0 |

Ashless Dispersant Y was another commercially available succinimide-type dispersant, different in composition from Ashless Dispersant X.

TABLE VIII.—PETTER AV-1 ENGINE TESTS HD-1A PROCEDURE—1.0% SULPHUR FUEL

| Example No. | Ashless Dispersant (used at 1.9% concentration) | Average ring groove lacquer A | Average land lacquer B | Skirt lacquer C | A+B+C | Underside lacquer |
|---|---|---|---|---|---|---|
| | Ashless Dispersant X | 3.4 | 3.3 | 9.5 | 16.2 | 7.5 |
| | | 4.3 | 3.9 | 9.7 | 17.9 | 7.4 |
| LX | Example XII | 6.0 | 4.9 | 9.75 | 20.65 | 6.7 |
| LXI | Example XXX | 8.5 | 8.4 | 9.97 | 26.9 | 9.0 |
| LXIII | Example XXXI | 6.4 | 5.9 | 9.7 | 22.0 | 7.2 |
| LXII | Example XXI | 6.9 | 6.8 | 9.85 | 23.55 | 6.8 |
| | 10w/30 Motor Oil P | 3.5 | 2.2 | 9.1 | 14.8 | 5.7 |
| | | 2.0 | 2.0 | 9.45 | 13.5 | 5.0 |
| | 10w/40 Motor Oil Q | 4.0 | 4.3 | 9.5 | 17.8 | 6.8 |

We claim:
1. A novel oil-soluble compound, particularly suitable as an additive for lubricating compositions, selected from the group consisting of

(a) 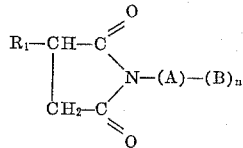

(b) 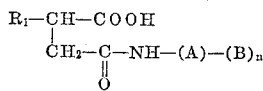

and (c) 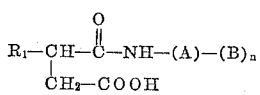

wherein;
$R_1$ is selected from the group consisting of alkyl and alkenyl radicals containing at least 12 carbon atoms;
A is an amino hydrocarbon or amino hydroxy hydrocarbon radical containing from 1 to 6 amino groups;
$n$ of $-(B)_n$ is an integer of from 1 to 6;
B is a radical having the formula: $-(CRR)_m-SO_3H$ where $m$ is 3 or 4, said radical being attached through the carbon atom to a nitrogen atom of A, and wherein R is selected from the group consisting of a hydrogen atom and a hydrocarbon group having not more than 10 carbon atoms, provided, however, that any two substituents R on adjoining carbon atoms may together form a cyclic system;
and the internal salts of the foregoing compounds.

2. A compound as claimed in claim 1 wherein the compound has the general formula

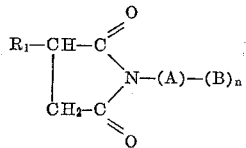

3. A compound as claimed in claim 2, wherein A has the formula $-(R_7NH)_x$ where $R_7$ is a divalent alkylene radical having from 2 to 5 carbon atoms, and $x$ is an integer of from 1 to 6.

4. A compound as claimed in claim 2 wherein $R_1$ is an α-alkenyl group derived from a polyisobutylene having a molecular weight of from 700 to 3000.

5. A compound as claimed in claim 1 where $m$ is 3.

6. A lubricating composition consisting essentially of a compound as claimed in claim 1 in solution in a lubricating oil in an amount of from 0.5% to 5.0% by weight on the weight of the oil.

7. A lubricating composition as claimed in claim 6 in which there is dispersed an alkaline earth metal base.

8. A lubricating composition as claimed in claim 7 wherein the base is a carbonate.

9. A lubricating composition consisting essentially of a compound as claimed in claim 2 in solution in a lubricating oil in an amount of from 0.5% to 5.0% by weight on the weight of the oil.

10. A lubricating composition as claimed in claim 9, wherein there is also dissolved in the oil from 0.2 to 2.0% by weight of the zinc salt of a dialkyl dithiophosphoric acid derived from a $C_4$-$C_{10}$ alcohol or a mixture of such alcohols.

11. A lubricating composition as claimed in claim 10 consisting essentially of a major amount of mineral oil of lubricating viscosity and dissolved therein from 0.5% to 2.0% by weight of the compound claimed in claim 4 and containing at least 5 nitrogen atoms, from 0.5% to 1.5% by weight of the zinc salt of a dialkyl dithiophosphoric acid derived from a $C_4$-$C_{10}$ alcohol or mixture of such alcohols, from 0.5% to 2.0% by weight of an alkyl polymethacrylate viscosity index improver, and from 1% to 5% of a carbonated overbased barium salt of a phosphosulphurised polyisobutylene.

12. A compound of the formula

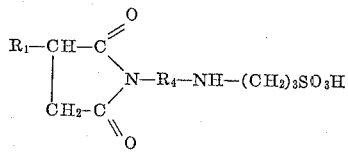

wherein:
$R_1$ is an α-alkenyl group derived from a polyisobutylene having a molecular weight of from 200 to 3000.
$R_4$ is an alkylene radical having 2 to 5 carbon atoms.

13. A compound of the formula

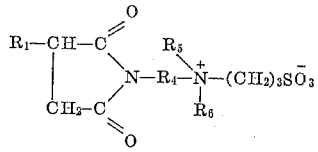

wherein:
$R_1$ is an α-alkenyl group derived from a polyisobutylene having a molecular weight of from 200 to 3000.
$R_4$ is an alkylene radical having 2 to 5 carbon atoms.
$R_5$ and $R_6$ are lower alkyl.

References Cited
UNITED STATES PATENTS 3,029,250   4/1962   Gaertner _____ 260—326.5
3,219,666   11/1965   Norman et al. _____ 252—51.5

DANIEL E. WYMAN, *Primary Examiner.*

W. H. CANNON, L. G. XIARHOS,
*Assistant Examiners.*